United States Patent
Yi

(10) Patent No.: US 10,621,335 B2
(45) Date of Patent: Apr. 14, 2020

(54) METHOD AND DEVICE FOR VERIFYING SECURITY OF APPLICATION

(71) Applicant: BOE Technology Group Co., Ltd., Beijing (CN)

(72) Inventor: Zhusong Yi, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 191 days.

(21) Appl. No.: 15/743,561

(22) PCT Filed: Feb. 27, 2017

(86) PCT No.: PCT/CN2017/074986
§ 371 (c)(1),
(2) Date: Jan. 10, 2018

(87) PCT Pub. No.: WO2018/086276
PCT Pub. Date: May 17, 2018

(65) Prior Publication Data
US 2019/0080079 A1    Mar. 14, 2019

(30) Foreign Application Priority Data
Nov. 10, 2016    (CN) .......................... 2016 1 0997124

(51) Int. Cl.
*G06F 21/00*    (2013.01)
*G06F 21/51*    (2013.01)
(Continued)

(52) U.S. Cl.
CPC ............... *G06F 21/51* (2013.01); *G06F 8/61* (2013.01); *G06F 12/1416* (2013.01);
(Continued)

(58) Field of Classification Search
None
See application file for complete search history.

(56) References Cited

U.S. PATENT DOCUMENTS

| | | | |
|---|---|---|---|
| 9,195,806 B1 * | 11/2015 | Robinson | G06F 21/79 |
| 2006/0101310 A1 * | 5/2006 | Diamant | G06F 21/12 |
| | | | 714/38.14 |

(Continued)

FOREIGN PATENT DOCUMENTS

| CN | 101551843 A | 10/2009 |
|---|---|---|
| CN | 103617394 A | 3/2014 |

(Continued)

OTHER PUBLICATIONS

First Office Action, including Search Report, for Chinese Patent Application No. 201610997124.0, dated Jan. 2, 2018, 12 pages.

(Continued)

*Primary Examiner* — Andrew J Steinle
(74) *Attorney, Agent, or Firm* — Westman, Champlin & Koehler, P.A.

(57) ABSTRACT

The present disclosure provides a method and device for verifying security of an application. The method comprises acquiring the application; determining a verification algorithm corresponding to the application according to application information of the application; and verifying the security of the application using the determined verification algorithm. The device comprises an application acquisition circuit configured to acquire the application; an algorithm determination circuit configured to determine a verification algorithm corresponding to the application according to application information of the application; and a security verification circuit configured to verify the security of the application using the determined verification algorithm.

13 Claims, 4 Drawing Sheets

(51) Int. Cl.
- *G06F 21/57* (2013.01)
- *G06F 21/78* (2013.01)
- *G06F 12/14* (2006.01)
- *G06F 8/61* (2018.01)
- *H04L 29/08* (2006.01)
- *G06F 21/56* (2013.01)

(52) U.S. Cl.
CPC ............ *G06F 21/562* (2013.01); *G06F 21/57* (2013.01); *G06F 21/78* (2013.01); *H04L 67/34* (2013.01); *G06F 2221/033* (2013.01); *G06F 2221/2115* (2013.01); *G06F 2221/2141* (2013.01)

(56) References Cited

U.S. PATENT DOCUMENTS

2010/0275026 A1* 10/2010 McLean .................. G06F 21/12
713/176

2016/0030831 A1* 2/2016 Stasson .................... A63F 1/12
273/149 R

FOREIGN PATENT DOCUMENTS

| CN | 105095696 A | 11/2015 |
| CN | 105376051 A | 3/2016 |
| CN | 106022098 A | 10/2016 |

OTHER PUBLICATIONS

International Search Report and Written Opinion for International Application No. PCT/CN2017/074986, dated Aug. 23, 2017, 8 pages.

English translation of International Search Report and Box V of the Written Opinion for International Application No. PCT/CN2017/074986, dated Aug. 23, 2017, 6 pages.

Second Office Action, including Search Report, for Chinese Patent Application No. 201610997124.0, dated Jul. 9, 2018, 15 pages.

* cited by examiner

METHOD AND DEVICE FOR VERIFYING SECURITY OF APPLICATION

CROSS-REFERENCE TO RELATED APPLICATION(S)

This application is a Section 371 National Stage Application of International Application No. PCT/CN2017/074986, filed Feb. 27, 2017, which is not yet published, and claims priority to the Chinese Patent Application No. 201610997124.0, filed on Nov. 10, 2016, which are incorporated herein by reference in their entirety.

TECHNICAL FIELD

The present disclosure relates to the field of communication security, and more particularly, to a method and device for verifying security of an application.

BACKGROUND

With the development of mobile communication technology, mobile devices such as smart phones, tablets and the like have become an indispensable part of people's work and life. These mobile devices provide a variety of functions, such as common chat applications, reading applications, shopping applications and the like, through applications (app) installed thereon.

However, these applications are installed and updated using a unified application installation package (for example, in an APK format) on, for example, an ANDROID® platform-based smart device. The ANDROID® platform only performs simple verification such as integrity verification and the like, but does not perform security verification such as authenticity verification on the application installation package. This is unreasonable and insufficient for applications which require high security such as bank payment (for example, Industrial and Commercial Bank of China (ICBC) Internet banking app, China Merchants Bank Internet banking app), third-party payment (for example, Alipay app and the like).

For example, when a malicious third party issues a malicious application having an interface which is very similar to that of, for example, the ICBC Internet banking app, the malicious third party may use the malicious application to cheat users, so as to acquire the users' key information such as usernames, passwords and the like, thereby potentially causing significant losses of the users. However, such a malicious application is undetectable and unrecognizable by most of normal users.

SUMMARY

According to a first aspect of the present disclosure, there is provided a method for verifying security of an application, comprising: acquiring the application; determining a verification algorithm corresponding to the application according to application information of the application; and verifying the security of the application using the determined verification algorithm.

In some embodiments, the step of determining a verification algorithm corresponding to the application according to application information of the application further comprises: establishing a correspondence relationship between verification algorithms and applications; and determining the verification algorithm corresponding to the acquired application according to the correspondence relationship.

In some embodiments, the method further comprises: acquiring the determined verification algorithm, and specifically, the verification algorithm is acquired by at least one of the following manners: pre-installing; downloading from a remote server; or copying through a storage medium. Thus, the step of acquiring the determined verification algorithm comprises: downloading the determined verification algorithm from a remote server of an application provider or a trusted third party according to page prompt information; or acquiring the determined verification algorithm from pre-installed verification algorithms issued by the application provider or the trusted third party; or acquiring the determined verification algorithm from verification algorithms issued by the application provider or the trusted third party and pre-stored in a local storage medium.

In some embodiments, the verification algorithms are stored in an access restricted region; and the correspondence relationship between the verification algorithms and the applications is also stored in an access restricted region. The two access restricted regions may be same or different.

In some embodiments, the access restricted region comprises at least one of a security memory and a security storage partition.

In some embodiments, the application information comprises at least one of an identifier, a file header, a name, a version or a digital digest.

In some embodiments, the step of verifying the security of the application using the verification algorithm comprises: verifying the security of the application using the verification algorithm based on a file header of the application.

In some embodiments, the file header at least comprises a digital digest of at least a part of data of the application.

In some embodiments, after verifying the security of the application using the determined verification algorithm, the method further comprises: on the condition that the application passes security verification, installing and/or updating the application; and on the condition that the application fails to pass the security verification, abandoning installing and/or updating the application.

In some embodiments, before determining a verification algorithm corresponding to the application according to application information of the application, the method further comprises: determining whether the application is a high security level application to be verified; and if so, performing subsequent steps.

In some embodiments, after determining a verification algorithm corresponding to the application according to application information of the application, the method further comprises: determining whether the verification algorithm corresponding to the application needs to be updated; and on the condition that the verification algorithm needs to be updated, updating the verification algorithm by downloading the verification algorithm from a remote trusted server or copying the verification algorithm through a secure storage medium.

In some embodiments, the verification algorithm is updated periodically or in response to a request.

According to a second aspect of the present disclosure, there is provided a device for verifying security of an application, comprising: an application acquisition circuit configured to acquire the application; an algorithm determination circuit configured to determine a verification algorithm corresponding to the application according to application information of the application; and a security verification circuit configured to verify the security of the application using the determined verification algorithm.

In some embodiments, the device further comprises: a correspondence relationship establishment circuit configured to establish a correspondence relationship between verification algorithms and applications. The algorithm determination circuit is further configured to: determine the verification algorithm corresponding to the acquired application according to the established correspondence relationship.

In some embodiments, the device further comprises an algorithm acquisition circuit. The algorithm acquisition circuit is configured to: download the determined verification algorithm from a remote server of an application provider or a trusted third party according to page prompt information; or acquire the determined verification algorithm from pre-installed verification algorithms issued by the application provider or the trusted third party; or acquire the determined verification algorithm from verification algorithms issued by the application provider or the trusted third party and pre-stored in a local storage medium.

According to a third aspect of the present disclosure, there is provided a device for verifying security of an application, comprising a processor; a memory, storing instructions, which when executed by the processor, cause the processor to cooperate with the memory to acquire the application; determine a verification algorithm corresponding to the application according to the application; and verify the security of the application using the verification algorithm.

According to a fourth aspect of the present disclosure, there is provided a readable storage medium storing instructions, which when executed by a processor, cause the processor to perform the method according to the first aspect of the present disclosure.

BRIEF DESCRIPTION OF THE DRAWINGS

The above and other purposes, features and advantages of the present disclosure will become more apparent from the following description of the embodiments of the present disclosure, taken in conjunction with the accompanying drawings, in which.

DETAILED DESCRIPTION

Figure 1:
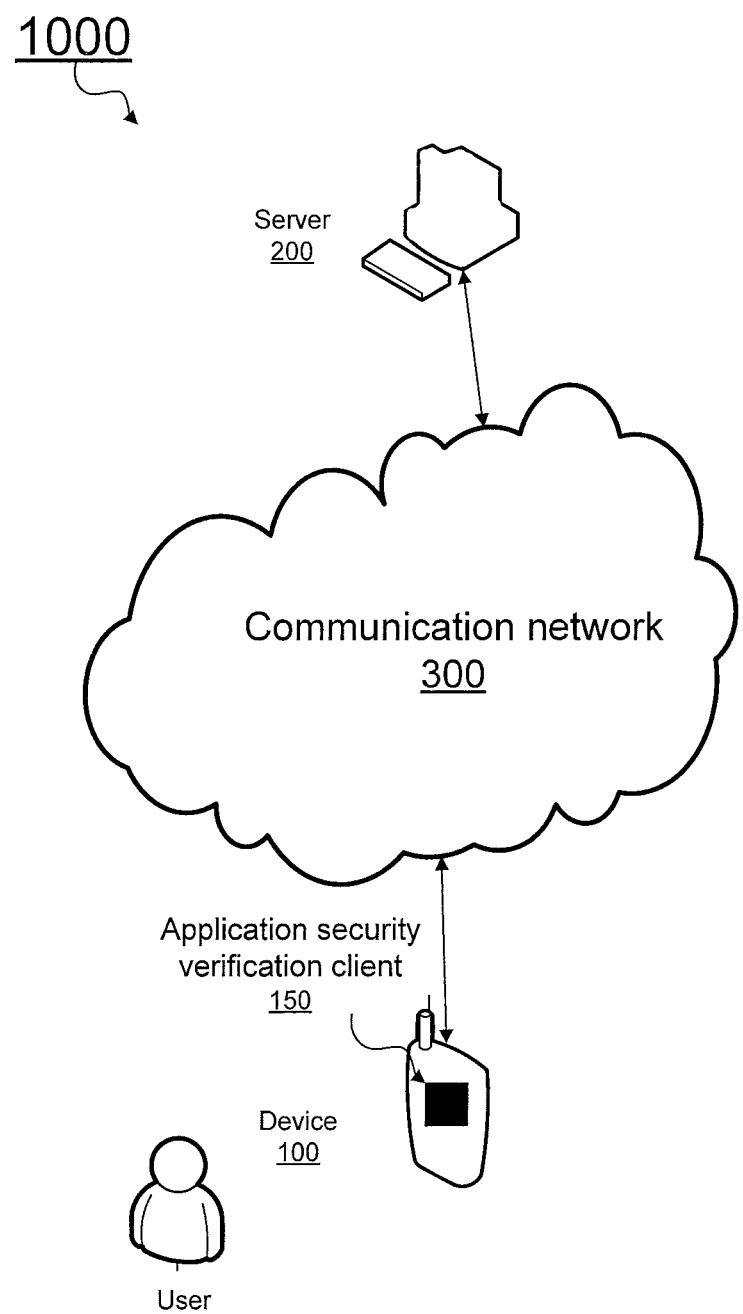
FIG. 1 is a diagram illustrating an exemplary application scenario of a solution of verifying security of an application according to an embodiment of the present disclosure.

Embodiments of the present disclosure will be described in detail below with reference to the accompanying drawings, in which details and functions which are not necessary for the present disclosure are omitted in the description in order to prevent confusion in the understanding of the present disclosure. In the present specification, the following description of various embodiments for describing the principles of the present disclosure is illustrative only and should not be construed as limiting the scope of the disclosure in any way. The following description of the drawings, with reference to the accompanying drawings, is provided to assist in a comprehensive understanding of the example embodiments of the disclosure as defined by the claims and their equivalents. The following description includes many specific details to assist in the understanding, but such details are to be regarded as merely exemplary. Accordingly, those of ordinary skill in the art will recognize that numerous changes and modifications can be made to the embodiments described herein without departing from the scope and spirit of the present disclosure. In addition, descriptions of well-known functions and structures are omitted for clarity and conciseness. In addition, the same reference numerals are used for the same or similar functions and operations throughout the accompanying drawings.

Hereinafter, the present disclosure is described in detail, by taking a scene in which the present disclosure is applied to a wireless mobile communication system as an example. However, the present disclosure is not limited thereto, and the present disclosure may also be applied to a fixed communication system, a wired communication system, or any mixed structure of a wireless mobile communication system, a fixed communication system, a wired communication system. With respect to mobile communication systems, the present disclosure is not limited to specific communication protocols of the respective mobile communication devices involved and may comprise, but is not limited to 2G, 3G, 4G, 5G networks, WCDMA, CDMA2000, TD-SCDMA systems, WIFI, BLUETOOTH® technology, WiMax and the like, and different mobile devices may use a same communication protocol, or may use different communication protocols. In addition, the present disclosure is not limited to a specific operating system of the mobile device, and may include, but is not limited to, iOS, Windows Phone, SYMBIAN® OS, ANDROID® OS, WINDOWS® OS, Linux and the like. Different mobile devices may use the same operating system, or may use different operating systems.

In the present disclosure, the terms "comprising" and "including" and their derivatives are intended to be inclusive instead of being limiting, and the term "or" is inclusive, which means "and/or".

In general, the present disclosure proposes a solution for verifying security of an application. In some embodiments, an algorithm corresponding to a downloaded application to be installed/updated may be implanted in a smart device, and authenticity and integrity of the application is verified through a digital signature or in other manners. An application is verified through a signature using an algorithm embedded in an algorithm region each time the application is downloaded or updated, and the application can be installed and updated only when the verification is passed, thereby ensuring the security of the application itself. In addition, in some embodiments, algorithms in the algorithm region may also be updated to prevent the algorithms from being cracked.

FIG. 1 is a diagram illustrating an application scenario of a system 1000 for verifying security of an application according to the present disclosure. As shown in FIG. 1, the system 1000 may comprise a device 100 and a server 200. For clarity, only one device 100 and one server 200 are shown in the figure, but the present disclosure is not limited thereto, and two or more devices and/or servers and the like may be comprised, or there may be even no server. The device 100 may belong to a user or may be operated by the user. The device 100 and the server 200 may communicate through a communication network 300. Examples of the communication network 300 may comprise, but are not limited to, the Internet, a mobile communication network, a fixed line (for example, an xDSL, an optical fiber, and the like).

Although the device 100 is illustrated as a mobile phone type device in the embodiment shown in FIG. 1, the present disclosure is not limited thereto. In some embodiments, the device 100 may be, but is not limited to, a smart phone, a tablet, an electronic book, a laptop, a desktop computer, a set-top box, a smart TV, a home gateway, or any electronic device having an application verification function described in the embodiments of the present disclosure.

In the embodiment shown in FIG. 1, in order to verify security of an application on the device 100, an application security verification client 150 (hereinafter referred to as a client 150) according to an embodiment of the present disclosure is installed on the device 100. The client 150 may be installed in the device 100 by a user himself/herself in a form of software or may be installed in the device 100 by a manufacturer in a form of hardware or firmware. In some embodiments, the client 150 may be application software dedicated to the embodiments of the present disclosure, which is, for example, downloaded by a user from a network after the user purchases the device 100. In some other embodiments, the client 150 may be an application pre-installed in the device 100 by a manufacturer, for example, in a form of firmware or hardware. In yet some other embodiments, the client 150 may be the hardware module produced by a manufacturer or device 100 itself. Hereinafter, the device 100 and the client 150 may be used interchangeably unless otherwise stated.

Specifically, in some embodiments, the client 150 may be a system application which replaces a standard application installation program in an ANDROID® system or may be an application installation program which monitors a process in the background and may intercept a standard application installation flow to realize a security verification function thereof. In addition, the client 150 may also be any application which operates together with a standard application installation program in a collaborative manner to implement solutions according to the embodiments of the present disclosure.

In the following embodiments of the present disclosure, an ANDROID® platform-based device will be taken as an example for convenience of description. However, it will be recognized by those skilled in the art that the concepts of the present disclosure are equally applicable to other suitable platforms such as iOS, SYMBIAN® OS, or even platforms of non-mobile devices, such as WINDOWS® OS, Linux, Unix and the like.

Figure 2:
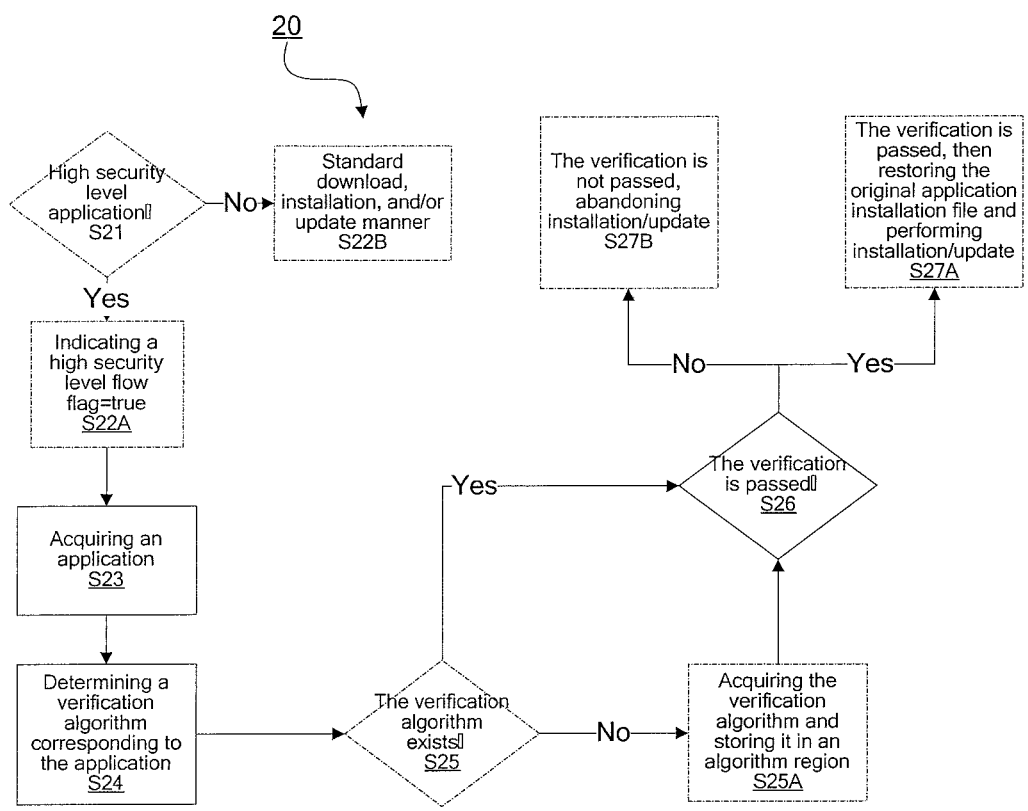
FIG. 2 is an exemplary overall flowchart illustrating a method for verifying security of an application according to an embodiment of the present disclosure.

An exemplary flow 20 implemented in the system 1000 for verifying security of an application according to an embodiment of the present disclosure will be described in detail below with reference to FIG. 2.

In some embodiments, firstly, in step S21, it may be judged whether the application to be acquired/downloaded/copied is an application which requires a high security level, such as the Internet banking application described above. In a simplest manner, when a user downloads the application, the user may be prompted with an option for the user to confirm whether the application is a high security level application. For example, the user may be presented with a download interface via a Graphical User Interface (GUI), wherein the download interface has optional items such as "a high security level application" and/or "a normal application", for the user to select and indicate a security level of a corresponding application.

In some other embodiments, the device 100 may automatically judge whether the application is an application which requires a high security level by detecting a name, a link (URL) of the application to be downloaded (or copied). In addition, a black/white list may also be preset in the device 100 to facilitate the device 100 to recognize whether the application is a high security level application.

In addition, the judgment of the security level of the application is not an essential step in the embodiments of the present disclosure. In fact, the security verification solution according to the embodiments of the present disclosure may also be used for all applications. For example, in a scenario where a high security level is required, security of all applications on the device 100 may be verified without individually judging security levels of various applications. Therefore, it is represented by a dotted box in FIG. 2 as an optional step. Hereinafter, in the description of FIG. 2, the dotted box indicates that the corresponding step is an optional step unless otherwise stated.

In some embodiments, on the condition that the device 100 determines that the application is not a high security level application in step S21, the device 100 may use a standard download, installation, and/or update flow for ANDROID® OS (S22B). For example, when the device 100 determines that it needs not to perform security verification on the application, it may download an apk file of the application directly from an application store, decompress the apk file and perform a standard installation flow for the apk file. As the standard installation flow is not the focus of the present disclosure, a detailed description thereof will be omitted. However, such omissions do not prevent those skilled in the art from implementing the technical solutions according to the present disclosure. For example, in the above embodiment of intercepting a standard installation flow, the operation of S22B can be implemented by returning control of the installation process to the standard installation flow.

In some embodiments, on the condition that the device 100 determines that the application is a high security level application in step S21, the device 100 may proceed to a security verification flow. For example, the device 100 may mark the application with "flag=true" in a working region thereof (for example, a cache, a memory or an external memory) to indicate that a subsequent flow of the application is a high security level flow (S22A).

In the high security level flow, in some embodiments, the device 100 may acquire the application to be verified through various channels (S23), for example, for subsequent verification/installation/update. For example, the application may be downloaded from an application store (for example, the App Store from Apple Corporation, the Play Store from Google Corporation, and the like) through the Internet. As another example, the application may be copied from another user through a portable storage medium such as an SD card, a USB flash drive, and the like. As a further example, the application may be acquired through a network (for example, from the server 200 shown in FIG. 1) by means of a quick response code, a web link, and the like. For the sake of brevity of description, description will be given below by taking an example of downloading and acquiring the application from the server 200; however, the embodiments of the present disclosure are not limited thereto. In some embodiments, the application may be placed in an application storage region of the device 100 when the application is acquired.

In the high security level flow, the application which is downloaded/copied/acquired is different from a general application. For example, in some embodiments, a high security level application in an application store has a special file header. As described below, the file header comprises verification data corresponding to a respective verification algorithm, and a format and content of the file header as well as the corresponding verification algorithm may be determined by an application provider.

| File header (verification data) | Original application installation file |
|---|---|

However, in some other embodiments, the format and content of the file header and the corresponding verification algorithm may also be specified and issued by a unified third party to avoid various application providers from maintaining respective algorithms thereof, so as to save operating costs thereof. In this case, although the format, the content, and the algorithm may be specified by the unified third party, as each application provider may have its own signature key (for example, a private key), it can be ensured that each application provider cannot counterfeit application installation files of other application providers. As a result, application-specific security verification is also achieved.

In some embodiments, the file header may comprise one or more file header fields. These fields may comprise, but are not limited to a type identifier (for example, a magic number) of such a file header, an application name, an application version number, a corresponding algorithm identifier, or a digital digest of an application program, and the like. The device 100 (or the client 150) may determine a verification algorithm corresponding to the high security level application according to the acquired application (for example, a file header of its installation file or other information) (S24).

For example, the device 100 (or the client 150) may determine that it is an application of which security is required to be verified and search for a corresponding verification algorithm according to the type identifier of the file header. As another example, the device 100 (or the client 150) may determine the corresponding verification algorithm according to one or more of the type identifier of the file header, the application name, the application version number, the corresponding algorithm identifier, the digital digest, and the like. In fact, it only needs to ensure that the device 100 (or the client 150) can determine the corresponding algorithm according to the application (for example, information included in the file header thereof). For example, the device 100 may determine a general algorithm for verifying the application according to an application name "ICBC Internet banking", or may select a specific algorithm for a version according to an application version number "1.0.0", or may determine a more specific algorithm for a particular application to be downloaded/copied according to a digital digest, or may directly uses a verification algorithm which is specified by an algorithm identifier. In addition, the file header may not comprise one or more of the above.

In addition, in some other embodiments, the application installation file may not have a special file header but an original ANDROID® application installation file, except that the file is suffixed with a file tail at the end thereof, so as to achieve the same function as that of the file header. As another example, in still some other embodiments, the application may have special fields in some part of the file to achieve the same function. Therefore, the embodiments of the present disclosure are not limited to the cases of the file header and the file tail described above.

In addition, in some other embodiments, the device 100 (or the client 150) may not determine the verification algorithm according to the file header, the file tail, or the data part specified in the file. For example, in some embodiments, the device 100 (or the client 150) may determine the corresponding verification algorithm according to the name, the size, the digital digest and the like of the downloaded application installation file instead of various fields in the file header.

In addition, when the algorithm corresponding to the application is determined, the device 100 may judge whether it has acquired/has the algorithm. When the algorithm is acquired, the algorithm may be placed in a corresponding algorithm storage region. In some embodiments, the algorithm storage region may be an access restricted region, for example, a separate physical/logical memory, a separate physical/logical memory partition and the like. The algorithm storage region is a storage region which can only be accessed by an authorized process (for example, a process of the client 150 according to the embodiments of the present disclosure). In some embodiments, the algorithm storage region may be an encrypted storage region. Thereby, the security of the algorithm itself is further ensured, and a malicious third party is prevented from having a chance to tamper with the algorithm to steal user information. However, it should be noted that in some embodiments of the present disclosure, the separate algorithm storage region is not essential, but is optional.

The algorithm may be acquired at any suitable time in a variety of ways. For example, firstly, the algorithm storage region may be searched to judge whether the determined verification algorithm exists (S25). For example, the algorithm may be a uniform verification algorithm which is pre-embedded in the algorithm storage region in the device 100 when the device 100 is manufactured, is downloaded remotely after the algorithm corresponding to the application is determined, or is downloaded in advance (S25: YES). On the condition that the corresponding algorithm is not searched in the algorithm storage region in step S25, the algorithm may be downloaded in real time, for example from an application provider and/or a trusted third party (for example, the server 200 as shown in FIG. 1 or another server) (S25A), or the algorithm may be copied from another user through a portable storage medium (S25A), which is not limited in the present disclosure. In addition, in the present embodiment, the trusted third party (for example, the server 200) may be, for example, a root certificate holder such as a certificate authority. It should be trusted by all parties involved in the communication and is a start point of a chain of trust. However, in the embodiments of the present disclosure, the trusted third party is not limited to the above certificate authority, but may be any third party which is trusted by both the device 100 and the application provider which issues the application.

Specifically, when, for example, a channel for acquiring the algorithm is a secure channel, for example, when the algorithm is acquired from a specified trusted third party or an application provider which issues an official application, the algorithm itself may not be verified and the algorithm itself is trusted to be secure. However, when it is uncertain whether the channel for acquiring the algorithm is a secure channel, the algorithm itself also needs to be verified. For example, the security of the algorithm itself (for example, integrity, authenticity and the like) may be verified by means of a certificate which is issued by the trusted third party for the algorithm. Specifically, platforms such as WINDOWS® OS, Linux, ANDROID® OS and the like, have a built-in root certificate which assures a user that the installed algorithm is indeed provided by a software (algorithm) provider specified in other certificates sponsored by the root certificate. Thus, the security of the algorithm can be ensured.

In some embodiments, after both the application and the algorithm are acquired, the application may be verified using a corresponding algorithm which is determined according to the application and is stored in the algorithm storage region (S26). For example, a digital digest of an original application installation file or at least a portion thereof of the acquired application may be calculated firstly by using the determined verification algorithm (for example, MD5, SHA1, and the like) and is compared with a digital digest field in the file header. On the condition that they are consistent, it indicates that the original application installation file has not been tampered with and is a real application issued by the software provider. On the condition that they are inconsistent, it can be determined that the installation file has been tampered with and belongs to an illegal/malicious application, and installation of the installation file is further abandoned, the installation file is deleted, or an alarm is transmitted to the user and the like (S27B). On the condition that the verification is passed, the device 100 (or the client 150) may remove the file header, the file tail, or other data portions for verifying the application and restore the application installation file to the original application installation file, so that the application can be installed using a standard ANDROID® installation program, or may be installed automatically (S27A).

In addition, in some embodiments, all/a part of the algorithms in the algorithm region in device 100 may also be updated periodically (for example, daily, weekly, monthly, and the like) or may be updated in response to a request from a user or an application. For example, when the downloaded application is an application which is initially installed, a corresponding algorithm may be requested to be downloaded (which may also be considered as being updated) in step S25 above. When the downloaded application is an application to be subsequently updated, it may be judged in step S25 above whether a new verification algorithm needs to be downloaded (for example, as the algorithm identifier specifies a different verification algorithm from that for the initial installation) according to the application (for example, various fields in the file header thereof or other information). In a case that a new verification algorithm needs to be downloaded, the verification algorithm may be acquired and stored in the algorithm storage region as in step S25A.

At this point, the solution for verifying the security of the application has been described in detail with reference to FIG. 2. With the above solution, the application which requires high security can be effectively managed and controlled, thereby blocking channels for illegal applications to acquire private information of users.

Figure 3:
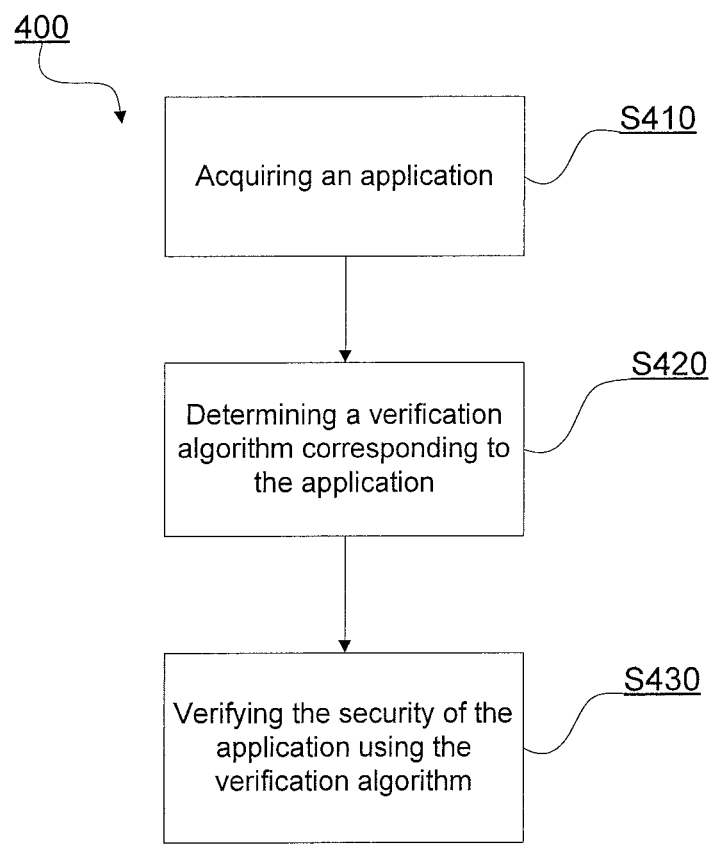
FIG. 3 is a flowchart illustrating an exemplary method performed at a device according to an embodiment of the present disclosure.

FIG. 3 is a flowchart illustrating a method 400 performed in the device 100 (or in multiple devices in a distributed manner) for verifying security of an application according to an embodiment of the present disclosure. As shown in FIG. 3, the method 400 may comprise steps S410, S420 and S430. According to the present disclosure, some steps of the method 400 may be performed separately or in combination, and may be performed in parallel or in sequence, which is not limited to a specific operation order shown in FIG. 3. In some embodiments, the method 400 may be performed by the device 100 and/or the client 150 shown in FIG. 1.

Figure 4:
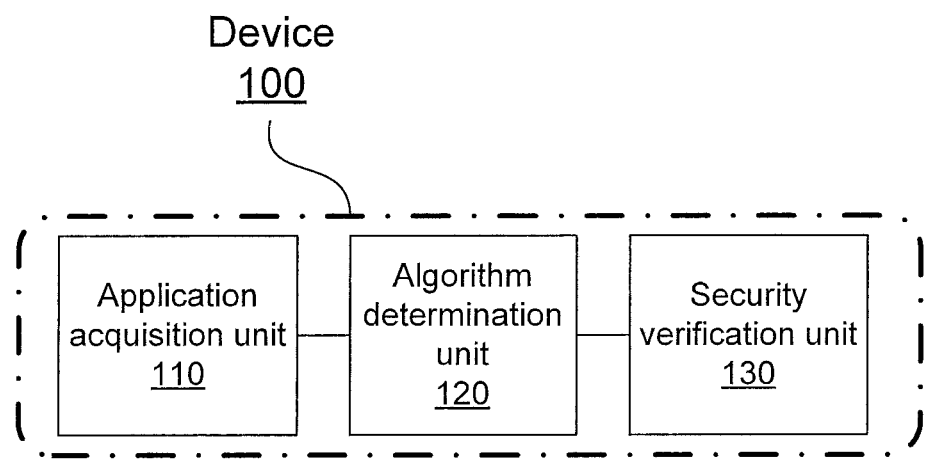
FIG. 4 is a block diagram illustrating an exemplary device for executing the method shown in FIG. 3 according to an embodiment of the present disclosure.

FIG. 4 is a block diagram illustrating an exemplary device 100 for verifying security of an application according to an embodiment of the present disclosure. As shown in FIG. 4, the device 100 may comprise an application acquisition circuit 110, an algorithm determination circuit 120, and a security verification circuit 130. As described above, these circuits may be separate hardware circuits, or may also be software modules executed by the processor of device 100, or a combination of the both.

The application acquisition circuit 110 may be configured to acquire the application. For example, the application acquisition circuit 110 may be a Central Processing Unit (CPU), a Digital Signal Processor (DSP), a microprocessor, a microcontroller of the device 100, and may cooperate with a communication portion (for example, a radio transceiver, an Ethernet card, an xDSL modem, and the like) and/or a storage portion (for example, a RAM, an SD card, and the like) of the device 100 to acquire the application to be installed/updated through the Internet and/or a portable storage medium.

The algorithm determination circuit 120 may be configured to determine a verification algorithm corresponding to the application according to the acquired application. For example, the algorithm determination circuit 120 may be a CPU, a DSP, a microprocessor, a microcontroller of the device 100, and may cooperate with a communication portion (for example, a radio transceiver, an Ethernet card, an xDSL modem, and the like) and/or a storage portion (for example, a RAM, an SD card, and the like) of the device 100 to determine and acquire the verification algorithm corresponding to the application through the Internet and/or a portable storage medium.

The security verification circuit 130 may be configured to verify the security of the application using the verification algorithm. The security verification circuit 130 may be a CPU, a DSP, a microprocessor, a microcontroller of the device 100, and may perform a verification algorithm on verification fields of the application such as a file header, a file tail and the like, and determine the security of the application.

In addition, the device 100 may further comprise other circuits, for example, an application installation/update circuit, a security level determination circuit, and/or an algorithm update circuit, and the like. In some embodiments, the application installation/update circuit may be configured to install and/or update the application on the condition that the application passes security verification, and abandon installing and/or updating the application on the condition that the application fails to pass the security verification. In some embodiments, the security level determination circuit may be configured to determine whether the application is a high security level application to be verified, and if so, invoke other circuits to perform subsequent steps. In some embodiments, the algorithm update circuit may be configured to determine whether the verification algorithm corresponding to the application needs to be updated; and on the condition that the verification algorithm needs to be updated, update the verification algorithm by downloading the verification algorithm from a remote trusted server or copying the verification algorithm through a secure storage medium. In addition, the device 100 may further comprise various common components for achieving the above and other functions, such as a bus, a power supply, an antenna, and the like.

The method 400 performed on the device 100 for verifying security of an application and the device 100 according to an embodiment of the present disclosure will be described in detail below with reference to FIG. 3 and FIG. 4.

The method 400 starts at step S410, in which an application may be acquired by the application acquisition circuit 110 of the device 100.

In step S420, a verification algorithm corresponding to the application may be determined by the algorithm determination circuit 120 of the device 100 according to the application.

In step S430, the security of the application may be verified by the security verification circuit 130 of the device 100 using the verification algorithm.

In some embodiments, the verification algorithm is issued by an application provider which issues the application or by a trusted third party. In some embodiments, the verification algorithm may be acquired by at least one of being pre-installed; being downloaded from a remote server; or being copied through a storage medium. In some embodiments, the verification algorithm may be stored in an access restricted region. In some embodiments, the access restricted region may comprise at least one of a secure memory, and a secure storage partition. In some embodiments, determining a verification algorithm corresponding to the application according to the application may comprise: determining the verification algorithm corresponding to the application according to one or more of an identifier, a file header, a name, a version, or a digital digest of the application. In some embodiments, verifying the security of the application using the verification algorithm may comprise: verifying the security of the application using the verification algorithm based on the file header of the application. In some embodiments, the file header may at least comprise a digital digest of at least a part of data of the application. In some embodiments, after verifying the security of the application using the verification algorithm, the method 400 may further comprise: on the condition that the application passes security verification, installing and/or updating the application; and on the condition that the application fails to pass the security verification, abandoning installing and/or updating the application. In some embodiments, before determining a verification algorithm corresponding to the application according to the application, the method 400 may further comprise: determining whether the application is a high security level application to be verified; and if so, performing subsequent steps. In some embodiments, after determining the verification algorithm corresponding to the application according to the application, the method 400 may further comprise: determining whether the verification algorithm corresponding to the application needs to be updated; and on the condition that the verification algorithm needs to be updated, updating the verification algorithm by downloading the verification algorithm from a remote trusted server or copying the verification algorithm through a secure storage medium. In some embodiments, the verification algorithm is updated periodically or in response to a request.

Figure 5:
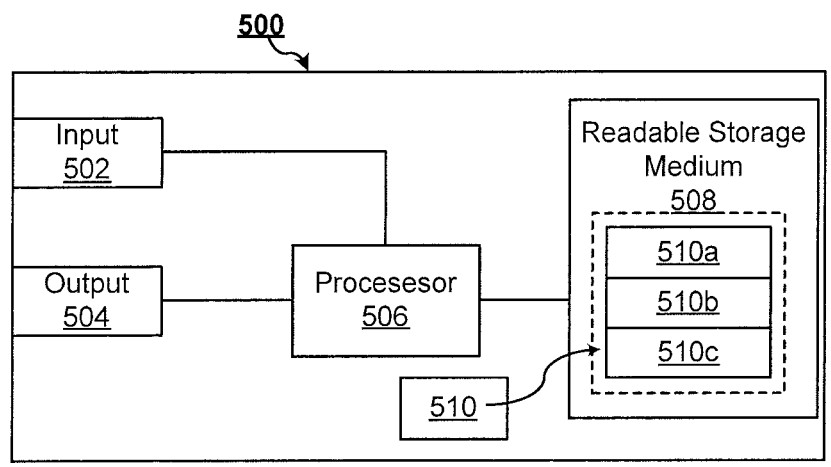
FIG. 5 is a block diagram illustrating an exemplary hardware arrangement of the device shown in FIG. 4 according to an embodiment of the present disclosure.

FIG. 5 is a block diagram illustrating an exemplary hardware arrangement 500 of the device 100 shown in FIG. 4 according to an embodiment of the present disclosure. The hardware arrangement 500 may comprise a processor 506 (for example, a DSP). The processor 506 may be a single processing circuit or a plurality of processing circuits for performing different actions of the flow described herein. The arrangement 500 may also comprise an input circuit 502 for receiving signals from other entities, and an output circuit 504 for providing signals to other entities. The input circuit 502 and the output circuit 504 may be arranged as a single entity or separate entities.

In addition, the arrangement 500 may comprise at least one readable storage medium 508 in a form of non-volatile or volatile memory, such as an Electrically Erasable Programmable Read-Only Memory (EEPROM), a flash memory, and/or a hard disk driver. The readable storage medium 508 comprises a computer program 510 which includes codes/computer readable instructions that, when executed by the processor 506 in the arrangement 500, enable the hardware arrangement 500 and/or the device 100 including the hardware arrangement 500 to perform, for example, flows described above in connection with FIGS. 1-4 and any variations thereof.

The computer program 510 may be configured with computer program codes having, for example, architecture of computer program modules 510A-510C. Therefore, in an exemplary embodiment when the hardware arrangement 500 is used in the device 100, the codes in the computer program of the arrangement 500 comprise a module 510A for acquiring an application. The codes in the computer program also comprise a module 510B for determining a verification algorithm corresponding to the application according to the application. The codes in the computer program also comprise a module 510C for verifying security of the application using the verification algorithm.

The computer program modules may substantially perform the various actions in the flow shown in FIGS. 1-4 to simulate the device 100. In other words, when different computer program modules are executed in the processor 506, they may correspond to the above different circuits in the device 100.

Although the code means in the embodiments disclosed above in conjunction with FIG. 5 are implemented as computer program modules that, when executed in the processor 506, cause the hardware arrangement 500 to perform the actions described above in connection with FIGS. 1-4, in alternative embodiments, at least one of the code means may be implemented at least in part as a hardware circuit.

The processor may be a single CPU, but may also comprise two or more processing units. For example, the processor may comprise a general purpose microprocessor, an instruction set processor, and/or a related chipset and/or a dedicated microprocessor (for example, an Application Specific Integrated Circuit (ASIC)). The processor may also comprise an on-board memory for caching purposes. The computer program may be carried by a computer program product connected to the processor. The computer program product may comprise a computer-readable medium having stored thereon a computer program. For example, the computer program product may be a flash memory, a RAM, a Read Only Memory (ROM), and an EEPROM, and the computer program module may, in an alternative embodiment, be distributed to different computer program products in a form of memory within the UE.

The present disclosure has thus far been described in connection with embodiments. It is to be understood that various other changes, substitutions and additions can be made by those skilled in the art without departing from the spirit and scope of the present disclosure. Accordingly, the scope of the present disclosure is not limited to the specific embodiments described above, but should be defined by the appended claims.

In addition, functions described herein as being implemented by only hardware, only software and/or firmware can also be implemented by means of dedicated hardware, a combination of general purpose hardware and software, and the like. For example, functions described as being implemented by dedicated hardware (for example, a Field Programmable Gate Array (FPGA), an ASIC, and the like) can be implemented by general purpose hardware (for example, a CPU, a DSP) in combination with software, and vice versa.

I claim:

1. A method for verifying security of an application from a server by a device, comprising the following steps:
   acquiring the application from the server;
   determining a verification algorithm corresponding to the application from a correspondence relationship between verification algorithms and applications stored in the device, according to application information of the application; and
   verifying the security of the application using the determined verification algorithm,
   wherein the verification algorithms are issued by an application provider or a trusted third party,
   wherein the verification algorithms are stored in an access restricted region; and the correspondence relationship between the verification algorithms and the applications is stored in an access restricted region, and
   wherein the access restricted region comprises at least one of a security memory and a security storage partition.

2. The method according to claim 1, the step of determining a verification algorithm corresponding to the application according to application information of the application further comprising:
   establishing the correspondence relationship between verification algorithms and applications.

3. The method according to claim 1, further comprising: acquiring the determined verification algorithm, wherein
   the determined verification algorithm is downloaded from a remote server of an application provider or a trusted third party according to page prompt information; or
   the determined verification algorithm is acquired from pre-installed verification algorithms issued by the application provider or the trusted third party; or
   the determined verification algorithm is acquired from verification algorithms issued by the application provider or the trusted third party and pre-stored in a local storage medium.

4. The method according to claim 1, wherein the application information comprises at least one of an identifier, a file header, a name, a version or a digital digest, and
   the step of verifying the security of the application using the determined verification algorithm comprises:
   verifying the security of the application using the determined verification algorithm based on a file header of the application,
   wherein the file header at least comprises a digital digest of at least a part of data of the application.

5. The method according to claim 1, wherein after the step of verifying the security of the application using the determined verification algorithm, the method further comprises:
   on the condition that the application passes security verification, installing and/or updating the application; and
   on the condition that the application fails to pass the security verification, abandoning installing and/or updating the application.

6. The method according to claim 1, wherein after the step of determining a verification algorithm corresponding to the application according to application information of the application, the method further comprises:
   determining whether the verification algorithm corresponding to the application needs to be updated; and
   on the condition that the verification algorithm needs to be updated, updating the verification algorithm by downloading the verification algorithm from a remote trusted server or copying the verification algorithm through a secure storage medium,
   wherein the verification algorithm is updated periodically or in response to a request.

7. The method according to claim 2, further comprising: acquiring the determined verification algorithm, wherein
   the determined verification algorithm is downloaded from a remote server of an application provider or a trusted third party according to page prompt information; or
   the determined verification algorithm is acquired from pre-installed verification algorithms issued by the application provider or the trusted third party; or
   the determined verification algorithm is acquired from verification algorithms issued by the application provider or the trusted third party and pre-stored in a local storage medium.

8. The method according to claim 2, wherein the application information comprises at least one of an identifier, a file header, a name, a version or a digital digest, and
   the step of verifying the security of the application using the determined verification algorithm comprises:
   verifying the security of the application using the determined verification algorithm based on a file header of the application,
   wherein the file header at least comprises a digital digest of at least a part of data of the application.

9. A device for verifying security of an application from a server, comprising:
   an application acquisition circuit configured to acquire the application from the server;
   an algorithm determination circuit configured to determine a verification algorithm corresponding to the application from a correspondence relationship between verification algorithms and applications stored in the device, according to application information of the application; and
   a security verification circuit configured to verify the security of the application using the determined verification algorithm,
   wherein the verification algorithms are issued by an application provider or a trusted third party,
   wherein the verification algorithms are stored in an access restricted region; and
   the correspondence relationship between the verification algorithms and the applications is stored in an access restricted region, and
   wherein the access restricted region comprises at least one of a security memory and a security storage partition.

10. The device according to claim 9, further comprising: a correspondence relationship establishment circuit configured to establish the correspondence relationship between verification algorithms and applications.

11. The device according to claim 9, further comprising: an algorithm acquisition circuit configured to:
   download the determined verification algorithm from a remote server of an application provider or a trusted third party according to page prompt information; or
   acquire the determined verification algorithm from pre-installed verification algorithms issued by the application provider or the trusted third party; or acquire the determined verification algorithm from verification algorithms issued by the application provider or the trusted third party and pre-stored in a local storage medium.

12. The device according to claim 10, further comprising:
an algorithm acquisition circuit configured to:
  download the determined verification algorithm from a remote server of an application provider or a trusted third party according to page prompt information; or
  acquire the determined verification algorithm from pre-installed verification algorithms issued by the application provider or the trusted third party; or
  acquire the determined verification algorithm from verification algorithms issued by the application provider or the trusted third party and pre-stored in a local storage medium.

13. A device for verifying security of an application, comprising: a processor; a memory, configured to store instructions, the instructions when being executed by the processor cause the processor to cooperate with the memory to perform:
  acquire the application from the server;
  determine a verification algorithm corresponding to the application from a correspondence relationship between verification algorithms and applications stored in the device, according to application information of the application; and
  verify the security of the application using the determined verification algorithm,
  wherein the verification algorithms are issued by an application provider or a trusted third party.

* * * * *